(12) United States Patent
Kempka, Jr.

(10) Patent No.: US 8,770,103 B2
(45) Date of Patent: Jul. 8, 2014

(54) PRESSER ASSEMBLY HAVING A PRESSER AND AN IMPROVED MOUNTING ARRANGEMENT FOR MOUNTING A PRESSING MEMBER TO THE PRESSER

(75) Inventor: Russell Kempka, Jr., Milwaukee, WI (US)

(73) Assignee: Blanking Systems, Inc., Grafton, WI (US)

(*) Notice: Subject to any disclaimer, the term of this patent is extended or adjusted under 35 U.S.C. 154(b) by 827 days.

(21) Appl. No.: 12/633,545

(22) Filed: Dec. 8, 2009

(65) Prior Publication Data

US 2011/0132956 A1    Jun. 9, 2011

(51) Int. Cl.
| | |
|---|---|
| *B30B 9/00* | (2006.01) |
| *B26F 1/40* | (2006.01) |
| *B26D 7/26* | (2006.01) |
| *B23P 11/00* | (2006.01) |
| *B26D 7/02* | (2006.01) |
| *B26D 7/18* | (2006.01) |

(52) U.S. Cl.
CPC ............... *B26D 7/1818* (2013.01); *B23P 11/00* (2013.01); *B26D 2007/189* (2013.01); *B26D 7/025* (2013.01); *B26F 1/40* (2013.01)
USPC .......................................... 100/214; 493/468

(58) Field of Classification Search
CPC .................. B26D 7/025; B26D 7/1818; B26D 2007/189; D23P 11/00; D26F 1/40
USPC ............ 100/266, 281, 283, 214; 493/83, 373, 493/468, 478; 225/103, 104, 105
See application file for complete search history.

(56) References Cited

U.S. PATENT DOCUMENTS

| | | |
|---|---|---|
| 707,803 A | 8/1902 | Smith |
| 1,071,959 A | 9/1913 | Schoenfeld |
| 1,404,239 A | 1/1922 | Seybold |
| 1,414,354 A | 5/1922 | Gibbs |
| 1,911,742 A | 5/1933 | Berry |
| 2,413,999 A | 1/1947 | Shaner |
| 2,558,456 A | 6/1951 | Palmer |
| 2,655,081 A | 10/1953 | Burger |
| 2,771,292 A | 11/1956 | Emerson |
| 3,049,060 A | 8/1962 | Vahle |
| 3,153,755 A | 10/1964 | Nestler et al. |
| 3,198,091 A | 8/1965 | Fahey |
| 3,228,659 A | 1/1966 | Sturm |
| 3,465,634 A | 9/1969 | Blais |
| 3,794,228 A | 2/1974 | Colwill |
| 3,952,633 A | 4/1976 | Nakai |

(Continued)

FOREIGN PATENT DOCUMENTS

| | | |
|---|---|---|
| CA | 593131 | 2/1960 |
| CH | A53131 | 11/1977 |

(Continued)

*Primary Examiner* — Jimmy T Nguyen
(74) *Attorney, Agent, or Firm* — Boyle Fredrickson, S.C.

(57) ABSTRACT

A presser assembly is provided in which a presser plate or presser board mounting adapter is clamped to a lower end of a presser stem. A rail having a lower channel and an upper channel is provided for clamping the presser plate or presser board mounting adapter to the stem, and more particularly, a presser foot coupled to the lower end of the stem. The present invention allows the presser plate or the presser board mounting adapter to be mounted to the stem without the use of tools or fasteners.

12 Claims, 11 Drawing Sheets

(56) References Cited

U.S. PATENT DOCUMENTS

| | | | |
|---|---|---|---|
| 3,952,634 A | 4/1976 | Rollins et al. | |
| 3,964,655 A | 6/1976 | Kotaro | |
| 4,025,053 A | 5/1977 | Stickle, Jr. | |
| 4,171,081 A | 10/1979 | Vossen et al. | |
| 4,243,166 A | 1/1981 | Vossen et al. | |
| 4,248,370 A | 2/1981 | Schroter | |
| 4,452,595 A | 6/1984 | Huff | |
| 4,488,466 A | 12/1984 | Jones | |
| 4,493,234 A | 1/1985 | Ziegler | |
| 4,500,306 A | 2/1985 | Nowacki | |
| 4,613,122 A | 9/1986 | Manabe | |
| 4,767,482 A | 8/1988 | Diez | |
| 4,858,888 A | 8/1989 | Cruz et al. | |
| 4,921,154 A | 5/1990 | Abe et al. | |
| 5,087,236 A | 2/1992 | Morimoto | |
| 5,192,053 A | 3/1993 | Sehlstedt | |
| 5,222,717 A | 6/1993 | Traficant | |
| 5,474,219 A | 12/1995 | Mano | |
| 5,494,553 A | 2/1996 | Colucci | |
| 5,529,565 A | 6/1996 | Oetlinger | |
| 5,599,269 A | 2/1997 | Oetlinger | |
| 5,766,123 A | 6/1998 | Oetlinger | |
| 5,810,233 A | 9/1998 | Varidel | |
| 5,971,378 A | 10/1999 | Sweeney | |
| 6,062,638 A | 5/2000 | Ferguson | |
| 6,213,451 B1 | 4/2001 | Finkbeiner | |
| 6,659,927 B2 | 12/2003 | Myers et al. | |
| 6,692,425 B2 | 2/2004 | Myers et al. | |
| 6,966,873 B2 | 11/2005 | Oetlinger | |
| 7,021,208 B2 * | 4/2006 | Du et al. | 100/269.12 |
| 7,128,703 B2 | 10/2006 | Oetlinger | |
| 7,185,797 B2 * | 3/2007 | Oetlinger et al. | 225/104 |
| 7,341,551 B2 | 3/2008 | Oetlinger | |
| 2002/0160898 A1 | 10/2002 | Myers et al. | |
| 2002/0160899 A1 * | 10/2002 | Myers et al. | 493/468 |
| 2005/0145116 A1 | 7/2005 | Oetlinger | |

FOREIGN PATENT DOCUMENTS

| | | |
|---|---|---|
| DE | 419900 | 10/1925 |
| DE | 2022951 | 1/1971 |
| DE | 2825631 | 1/1979 |
| DE | 3033648 | 4/1982 |
| EP | 0391299 | 10/1990 |
| FR | 2682633 | 10/1991 |
| RU | 286335 | 1/1968 |
| SE | 393061 | 8/1974 |

* cited by examiner

PRESSER ASSEMBLY HAVING A PRESSER
AND AN IMPROVED MOUNTING
ARRANGEMENT FOR MOUNTING A
PRESSING MEMBER TO THE PRESSER

BACKGROUND OF THE INVENTION

This invention relates to blanking systems, and in particular, to a method and apparatus for attaching a presser plate or a presser board mounting adapter to a presser.

In the manufacture of cartons, small sheets of paper material having specific profiles are cut out of larger sheets of paper material. These smaller sheets are known as carton blanks which, in turn, are formed into cartons and/or boxes. The blanks are formed during a process known as a blanking operation in a die cutting machine.

In a die cutting machine, the blanks are cut, but not removed from a large sheet of paper material. After the blanks have been cut, the sheet is moved downstream in the die cutting machine to a blanking station where the sheet is positioned over a frame for support. The frame includes large openings which correspond in size, in shape and in position to the profile of the carton blank previously cut. Below the frame is a mechanism for stacking the carton blanks.

At the blanking station, an upper tool is used in combination with the lower tool or frame to knock the carton blanks from the sheet of paper material while holding the scrap material that surrounds the blanks. The upper tool has a support board that moves vertically up and down in the die cutting machine, and the support board typically has a plurality of stand-offs depending therefrom that hold pushers spaced beneath the board which in turn are used to push the carton blanks from the sheet through the lower tool or frame. A plurality of presser assemblies are also mounted in the support board and depend therefrom to hold the scrap material against the lower tool or frame during the blanking operation so that the blanks may be pushed from the sheet. A presser assembly typically includes a presser rail which is biased downwardly away from the support board by a spring so that the rail is positioned slightly below the pushers. A presser plate is attached to the rail. As the upper tool is lowered, the presser plate engages the sheet of paper material first such that a scrap portion of the large sheet of material is secured against the frame. The upper tool then continues to be lowered such that the pushers engage the carton blanks and knock the blanks out of the sheet of material. The carton blank then falls into a stacking mechanism below the frame where the blanks are stacked for further processing.

Conventionally, the presser plate is attached to the rail using a pair of fasteners, e.g., screws. Accordingly, the presser plate has a pair of openings that must be aligned with corresponding openings formed in the bottom surface of the rail. Once aligned, the presser plate can be screwed to the rail. While effective in securing the plate to the rail, such a mounting system is labor intensive. Moreover, since a blanking station will typically have several presser assemblies, it can be quite time consuming to fasten a plate to each rail. And, since many blanking stations are used with different blanking processes that require different presser plates, the time consuming efforts in removing and replacing the existing presser plates can result in significant downtime of the blanking station and/or die cutting machine.

SUMMARY OF THE INVENTION

The present invention provides a presser assembly in which a presser plate can be quickly attached and detached from a presser rail, and therefore is believed to overcome the drawbacks of conventional presser assemblies. The present invention is also believed to provide a significant time savings in the installation and/or replacement of presser plates or presser boards. In this regard, the invention, in one implementation, enables a presser plate or a presser board mounting adapter to be installed without tools.

In accordance with one aspect of the invention, a presser assembly for a blank making machine is provided. The presser assembly comprises a foot having an upper surface and a lower surface. The presser assembly further comprises a shaft having an end pivotably coupled to the foot. A rail is provided and is shaped to define an upper channel and a lower channel. The foot sits in the upper channel of the rail and a presser plate (or a presser board mounting adapter) is retained in the lower channel of the rail.

The rail is configured so that the presser plate (or adapter) can be drop loaded into the lower channel. After the presser plate (or adapter) is loaded into the rail, the foot can be slid into the upper channel of the rail. The rail effectively clamps to the foot to secure the presser plate in place. The presser plate (or adapter) can be loaded into the lower channel and the foot slid into the upper channel without any tools or fasteners, such as screws.

In accordance with another aspect of the invention, a presser assembly for supporting blanking carton scrap is provided. The presser assembly has a hollow housing forming a cavity. A longitudinally extending stem is slidably received in the cavity for reciprocal movement therein and has an upper end passing through an open top of the hollow housing and a lower end passing through an open bottom of the hollow housing. A mounting member is coupled to the lower end of the stem and a guide chamber surrounds the stem. The guide chamber is received in the open bottom of the housing in telescoping relation. The presser assembly further includes a presser plate (or a presser board mounting adapter) and a rail clamping the presser plate (or adapter) against the mounting member.

It will be appreciated that the present invention also provides an inventive method for installing a presser member, such as a presser plate or presser board, to a presser assembly.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION

Figure 1:
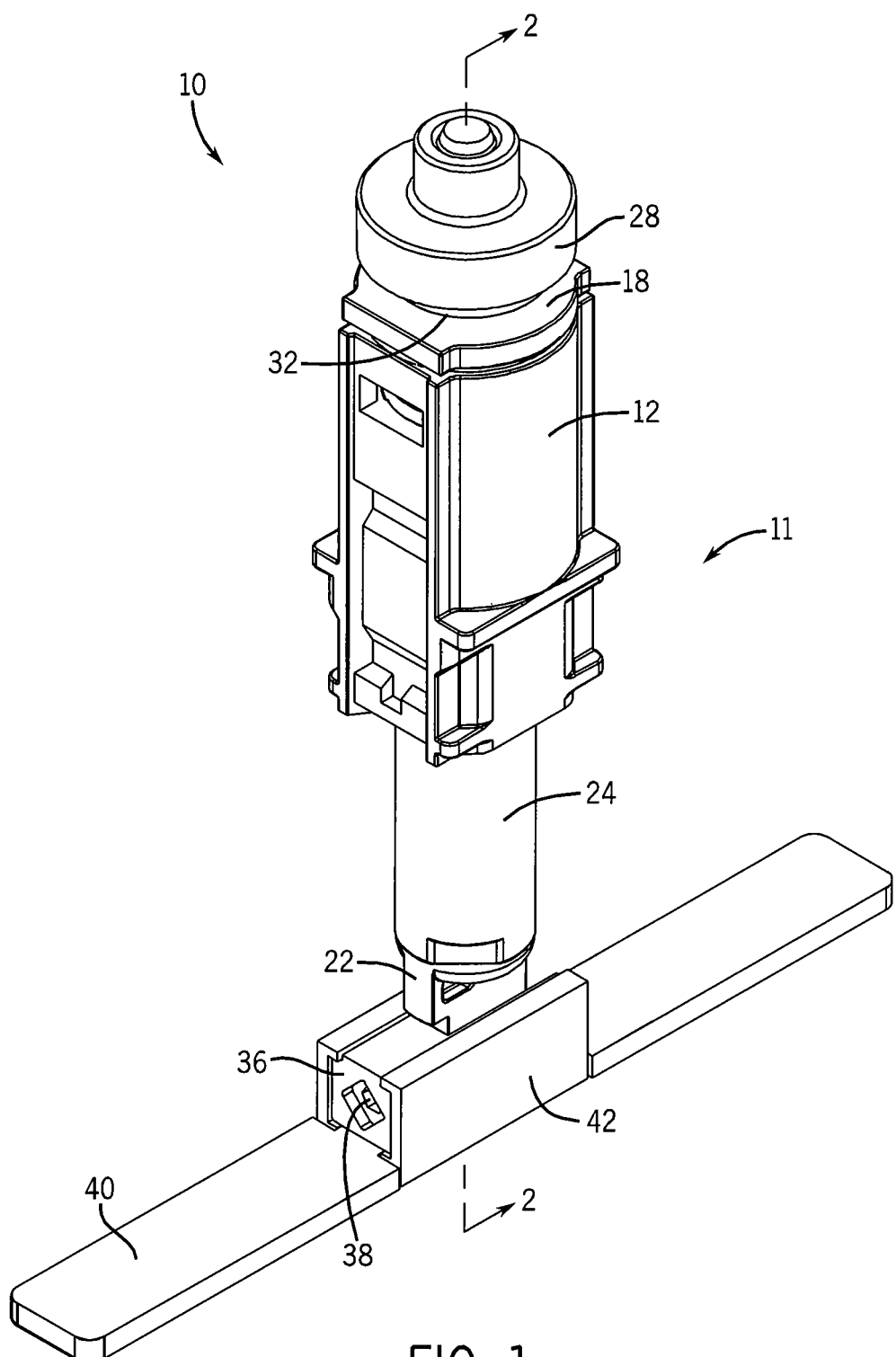
FIG. 1 is an isometric view of a presser assembly according to a first embodiment of the invention.
Figure 2:
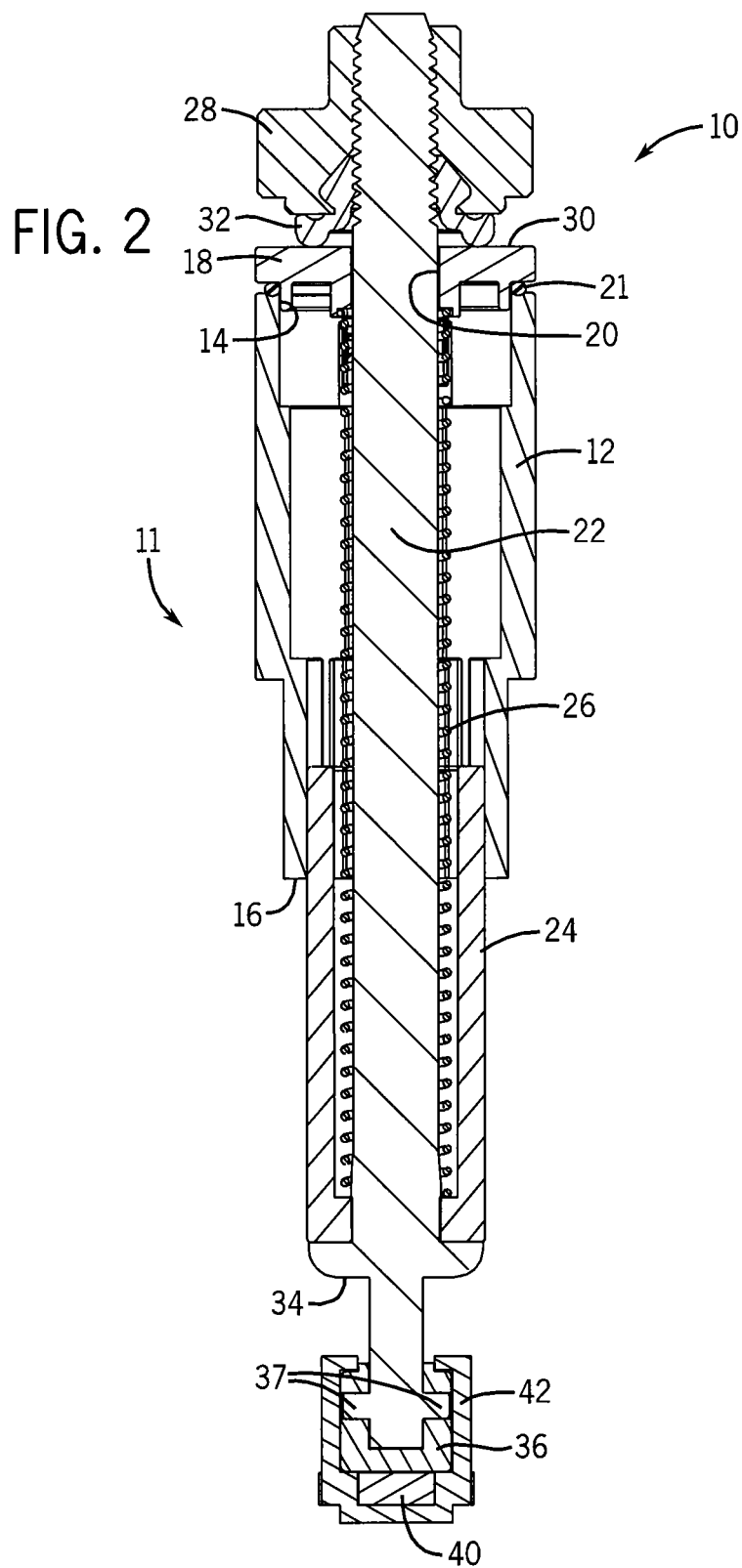
FIG. 2 is a section view of the presser assembly of FIG. 1 taken along line 2-2 of FIG. 1.

Referring to FIGS. 1 and 2, a presser assembly in accordance with the present invention is generally designated by the reference number 10. The presser assembly 10 includes a presser 11 having a generally cylindrical presser housing 12, which has an open top 14 and an open bottom 16. A presser cap 18 is engaged with the open top 14 and has an annular wall 20 defining an opening that communicates with the interior cavity of the housing 12. In a preferred embodiment, a washer 21 provides a seal between the presser cap 18 and the housing 12, and the presser cap 18 twist locks to the housing 12. A stem 22 passes through the housing 12 and through the opening formed in the presser cap 18. A tubular guide chamber 24 surrounds the stem 22 and extends through the open bottom 16 of the housing 12. The guide chamber 24 is received in the housing 12 in a telescoping manner which allows the housing 12 to slide along the exterior surface of the guide chamber 24. The stem 22 passes through a spring 26 that is retained in the housing 12 and the guide chamber 24. In addition to partially closing the open top of the housing 12, the presser cap 18 also holds the spring 26 in compression about the stem 22, as best shown in FIG. 2. The spring 26 is held under compression by a thumb nut 28 that engages the upper end of the stem 22. The thumb nut 28 also prevents the housing 12 from sliding off the stem 22. The bias of the spring 26 is such that the housing 12 is forced toward the upper end of the stem 22. In this regard, the upper surface 30 of the presser cap 18 is held against an annular bumper 32 situated between the presser cap 20 and the thumb nut 28. In a preferred embodiment, the thumb nut 28 and the upper end of the stem 22 include cooperating threads that allow the thumb nut 28 to be threaded onto the stem 22. It will be appreciated that as the thumb nut 28 is threaded onto the stem 22, the presser cap 18 is forced downward, which pushes the housing 12 downward over the guide chamber 24 and further compresses the spring 26.

A lower end of the stem 22 passes through an opening formed in the bottom surface 34 of the guide chamber 24, and is pivotably mounted to a presser foot 36. In one embodiment, two pins 37 extend outwardly from opposite sides of the lower end of the stem 22. The foot has a generally U-shaped body with holes (not shown) that align with the pins 37. The lower end of the stem 22 also includes two stops (not shown) that are received in corresponding openings (not shown) in the U-shaped body. The stops limit the pivoting of the stem 22 relative to the presser foot 36. In a preferred embodiment, the foot 36 is made of generally pliable material that allows a user to slightly deflect the walls of the U-shaped body to fit the body onto the lower end of the stem 22. A foot lock 38 is secured within the foot. A presser plate 40 is held against the foot 36 by a rail 42. As will be described in more detail below, the rail 42 is configured so that the presser plate 40 can be retained against the foot 36 without tools or fasteners.

Figure 3:
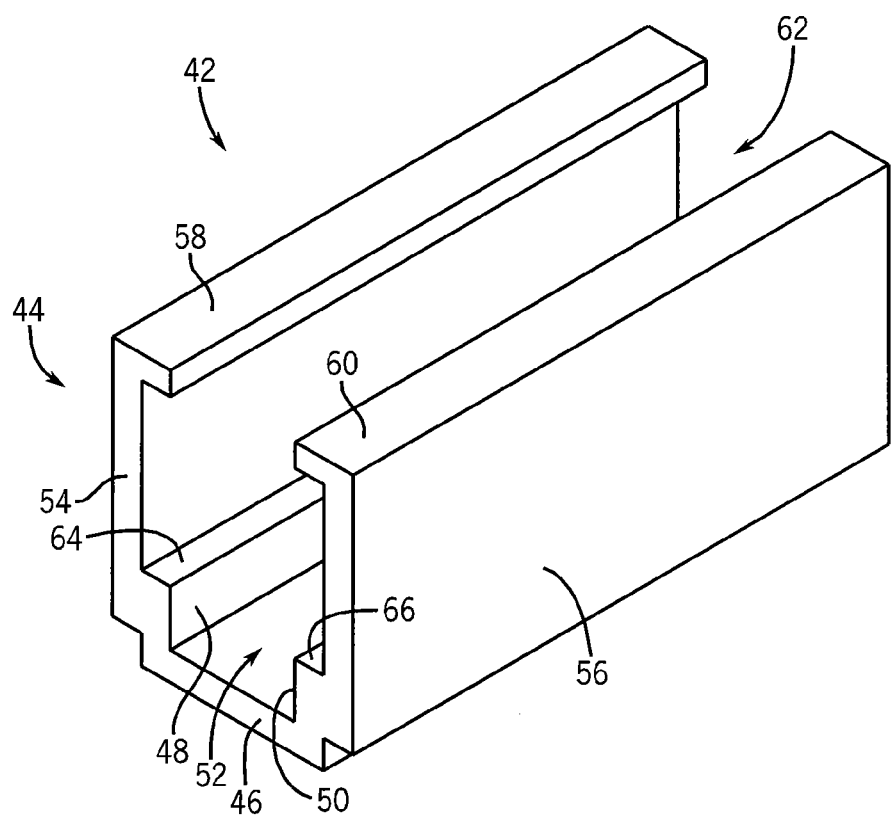
FIG. 3 is an isometric view of a rail of the presser assembly of FIG. 1 according to the present invention.

Referring now to FIG. 3, an isometric view of the rail 42 according to the present invention shows that the rail 42 has a generally C-shaped body 44 defined by a planar base 46 and upturned members 48 and 50. The planar base 46 and the upturned members 48, 50, collectively define a lower channel 52 that extends along the length of the rail 42. An upright wall 54 extends from the exterior surface of the upturned member 48 and, similarly, an upright wall 56 extends from the exterior surface of the upturned member 50. An inturned member 58 is formed at the top of the upright wall 54 and an inturned member 60 is formed at the top of upright wall 56. The upright walls 54, 56 and the inturned members 58, 60 collectively define an upper channel 62 that extends along the length of the rail 42 and adjacently above the lower channel 52. Since the upright walls 54, 56 extend from the exterior surfaces of upturned members 48, 50, respectively, the width of the lower channel 52 is less than the width of the upper channel 62. As shown in FIG. 3, the top surfaces 64, 66 the upturned members 48, 50, respectively, define the lower bound of the upper channel 62. The upper bound of the upper channel 62 is defined by the undersides of inturned members 58, 60. In a preferred embodiment, the rail 42 is formed as a single, unitary body using known fabrication techniques.

Figure 4:
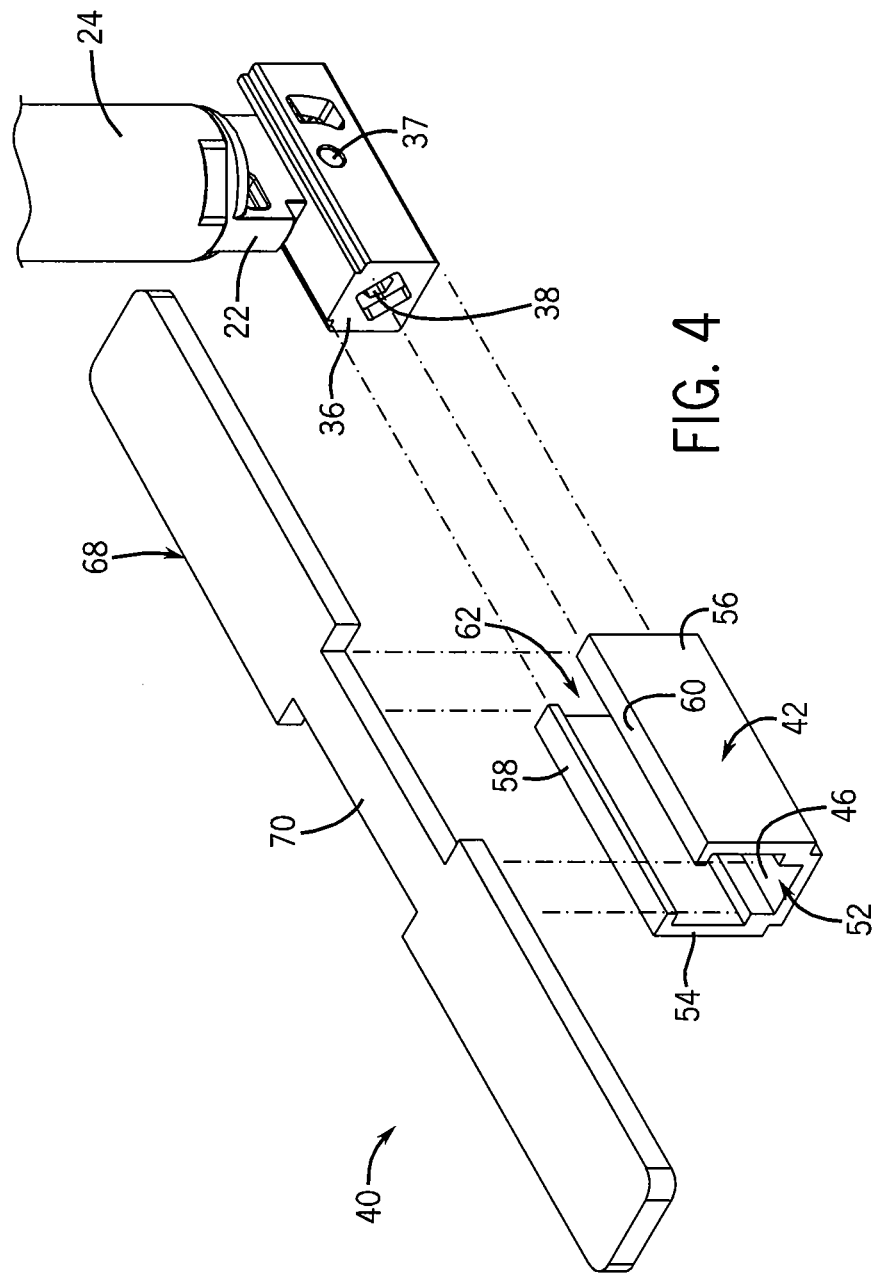
FIG. 4 is a partial exploded view of the presser assembly of FIG. 1 illustrating how the presser plate may be installed according to one embodiment of the invention.

Referring now to FIG. 4, the presser plate 40 includes an elongated planar body 68 and is adapted to be drop loaded into the lower channel 52 of the rail 42. In a preferred embodiment, the body 68 is formed to have a shortened section 70 that is narrower than the remainder of the body 68. This shortened section 70 is sized to substantially match the width and length of the lower channel 52 of the rail. The shortened section 70 therefore identifies where along the length of the body 68 the presser plate 40 is to be loaded into the rail 42. In an alternate embodiment, the body includes multiple narrower sections to provide multiple loading points for the presser plate 40. In yet another embodiment, the entire length of the body 68 has a width substantially matched to that of the lower channel 52 to allow the presser plate to be loaded into the lower channel 52 at any point along its length.

As further shown in FIG. 4, once the presser plate 40 is drop loaded into the lower channel 52 of the rail 42, the foot 36 may be slid into the upper channel 62. The profile of the foot 36 is generally matched to that of the upper channel 62 thereby providing a snug fit of the foot 36 in the upper channel 62. As noted above, the inturned members 58, 60 define the upper bound of the upper channel 62 and rest upon the top surface of the foot 36 when the foot 36 is inserted into the upper channel 62. It will thus be appreciated that the rail 42 effectively clamps the presser plate 40 to the foot 36, and indirectly couples the presser plate 40 to the stem 22.

In a preferred embodiment, the presser plate 40 is comprised of metal, such as steel. It is also noted that the shape of the presser plate 40 could be different from that illustrated in the figures.

Figure 5:
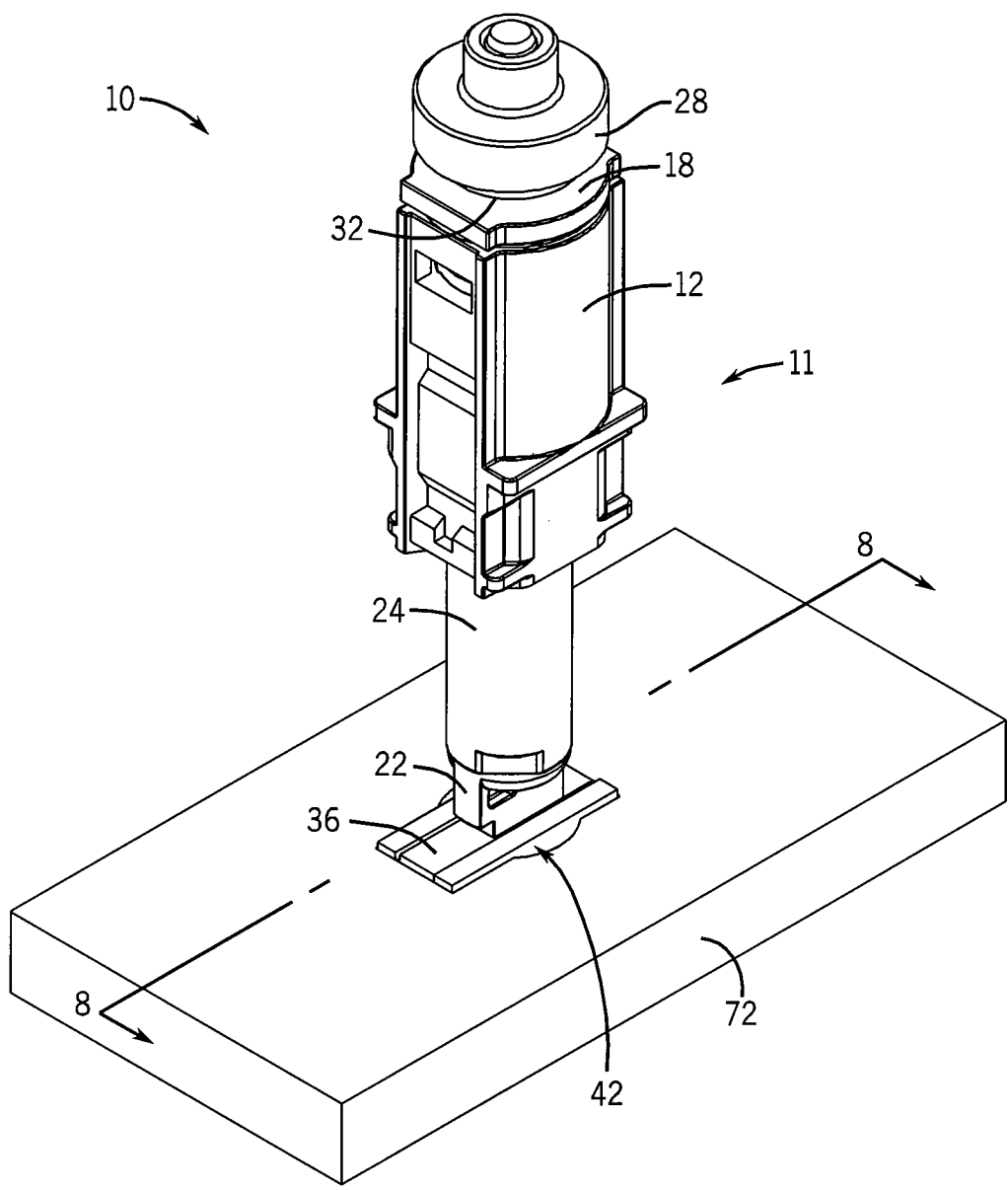
FIG. 5 is an isometric view of a presser assembly having a presser board according to a second embodiment of the invention.
Figure 6:
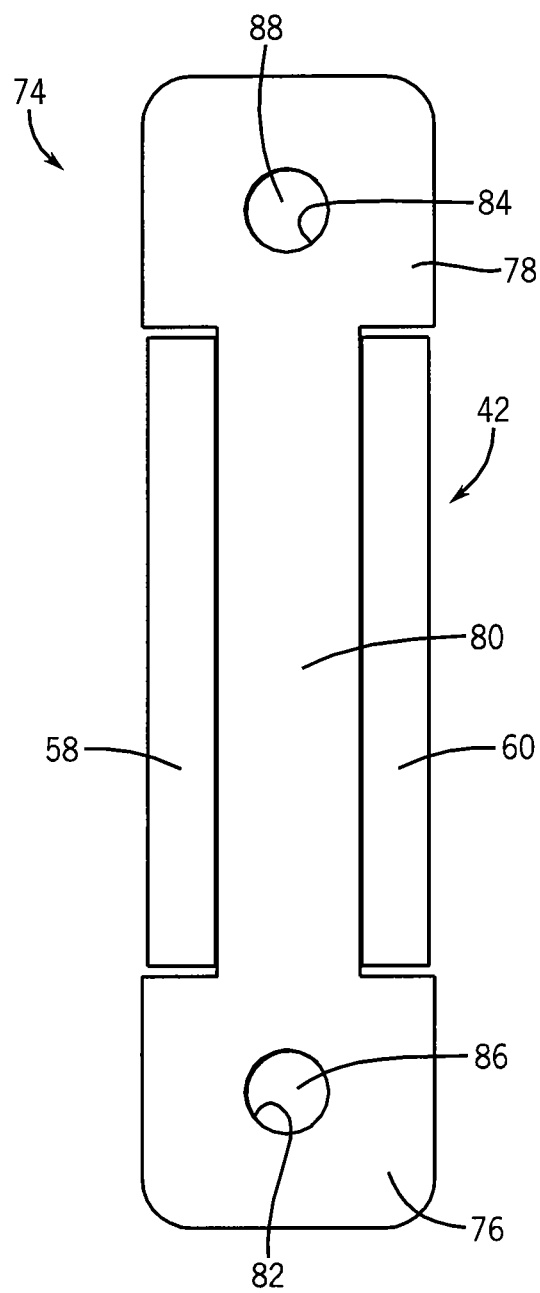
FIG. 6 is a top view of a mounting flange seated in the rail of FIG. 3.

FIG. 5 illustrates a presser board 72 coupled to the presser 11 according to an alternate embodiment of the present invention. The construction of the presser 11 is similar to that described with respect to FIGS. 1-4. As shown in the figure, the presser board 72 is larger than the presser plate 40 and therefore cannot be attached to the presser 11 in the same manner as the presser plate 40. In this regard, the present invention provides an adapter 74, as shown in FIG. 6, for interfacing with the rail 42.

Figure 7:
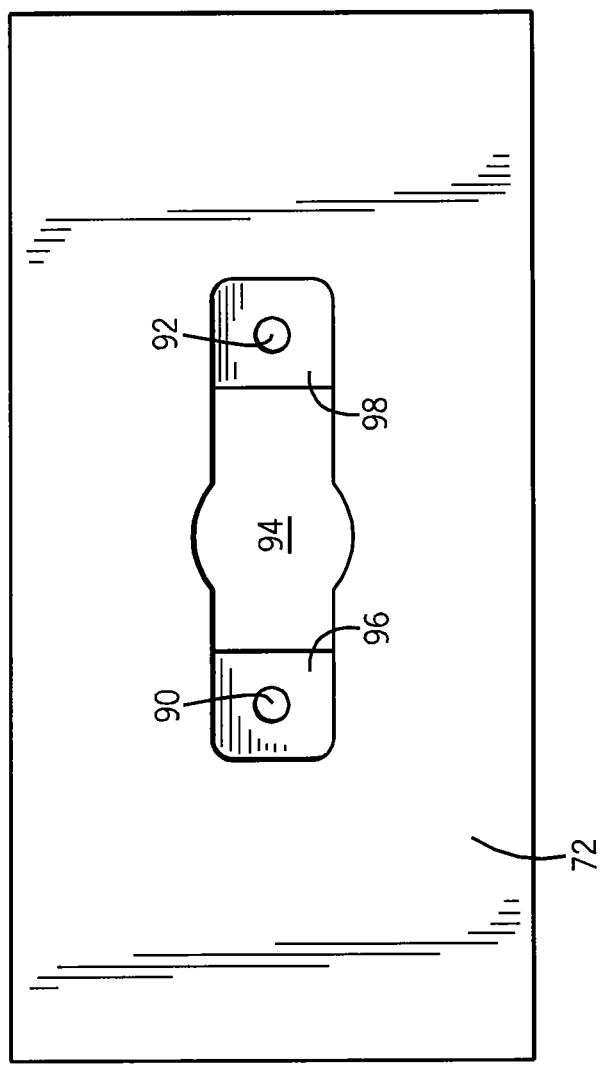
FIG. 7 is a bottom view of the presser board shown in FIG. 5.

The adapter 74 has a thin profile body defined by a pair of mounting flanges 76, 78 and a central post 80. Similar to the narrow portion of presser plate 40 described with respect to FIG. 4, the central post 80 of the adapter 74 is sized to fit in the lower channel 52 of rail 42. The flanges 76, 78 have curved walls 82, 84, respectively, which define openings 86, 88, respectively. The openings 86, 88 align with holes 90, 92 formed in the bottom surface of the presser board 72, as shown in FIG. 7.

To secure the presser board 72 to the presser 11, the stem 22 is inserted through a central opening 94 formed in the presser board 72. With the adapter 74 loaded into the lower channel 52 of the rail 42, and the stem 22 extending through the opening such that the foot 36 extends away from the presser board 72, the foot 36 is slid into the upper channel 62, in a manner similar to that described above. The adapter 74 is wider than the diameter of the central opening 94 and, as such, the stem 22 cannot be pushed back through the opening 94. Additionally, the housing 12 is larger than the opening 94, which prevents the presser 11 from being pulled through the opening 94.

Figure 8:
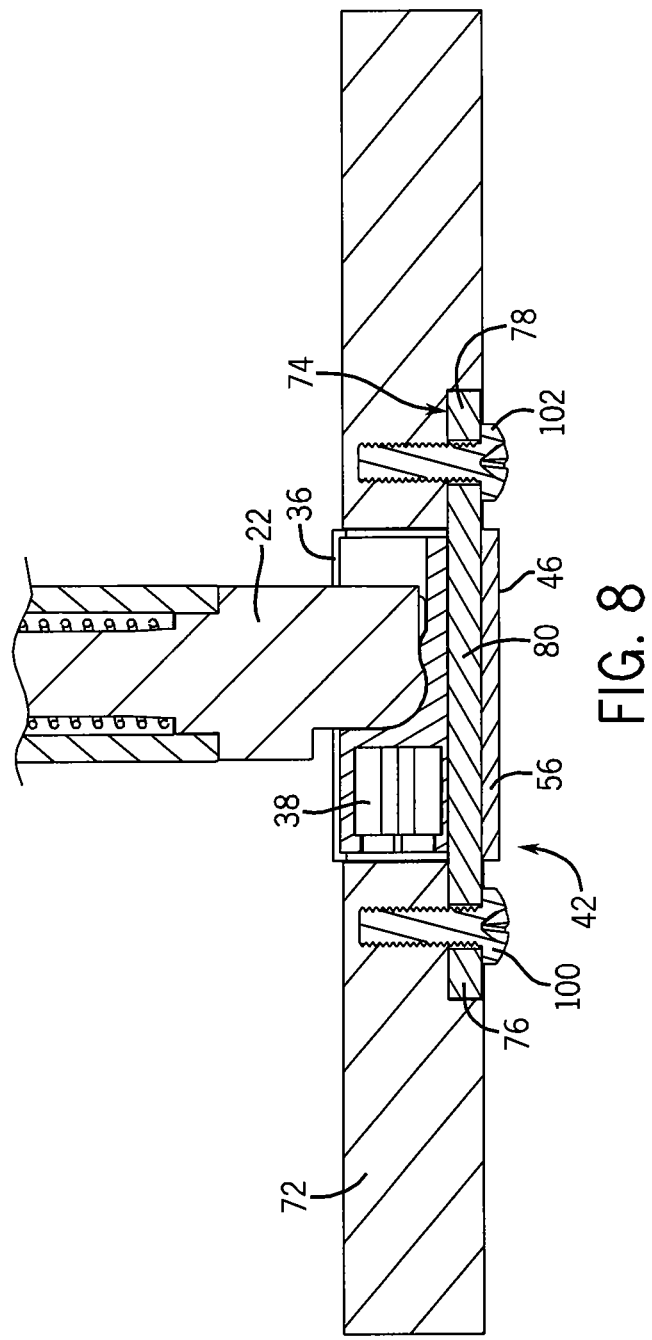
FIG. 8 is a section view of the presser assembly of FIG. 5 taken along line 8-8 of FIG. 5.

The bottom surface of the presser board 72 has two slightly recessed portions 96, 98 that receive the mounting flanges 76, 78, respectively, of the adapter 74. The recessed portions 96, 98 allow the adapter 74 to be flush mounted to the presser board 72. The recessed portions 96, 98, also assist in aligning the openings 86, 88 with holes 90, 92. As shown in FIG. 8, screws 100, 102 are used to couple the presser board 72 to the adapter 74.

Figure 9:
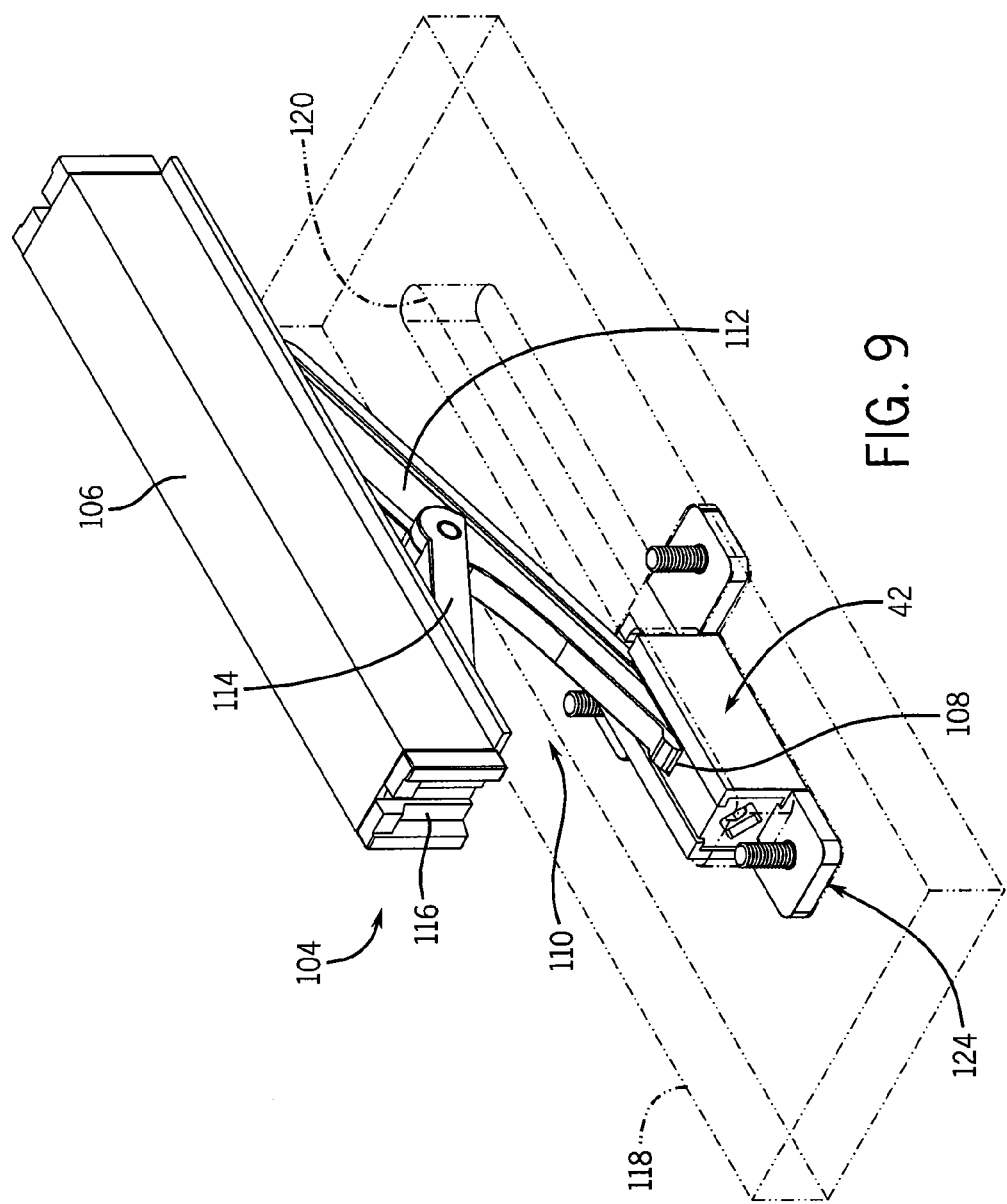
FIG. 9 is an isometric view of a presser assembly according to a third embodiment of the invention, with a presser board shown in phantom.

The rail 42 described herein may also be used with other types of pressers, such as a flush mounted presser 104 shown in FIG. 9. Presser 104 includes a base 106 that is interconnected to foot 108, which is similar to foot 36 described above, by a linkage assembly 110. The linkage assembly 110 has an arm 112, a link 114, and a slider (not shown). The linkage assembly 110 is similar to the third embodiment linkage assembly described in U.S. Pat. No. 7,341,551, the disclosure of which is incorporated herein. The upper end of the arm 112 is pivotably mounted to the slider within base 106. The lower end of the arm 112 is pivotably coupled to foot 108. The lower end of link 114 is pivotably mounted to the arm 112 generally at the midpoint between the upper and lower pivotable connections of the arm 112. The upper end of the link 114 is pivotably mounted to a mounting block 116 fixed within the base 106. As described in U.S. Pat. No. 7,341,551, the presser 104 moves in a vertical plane perpendicular to the horizontal plane defined by an upper surface of presser board 118.

Figure 10:
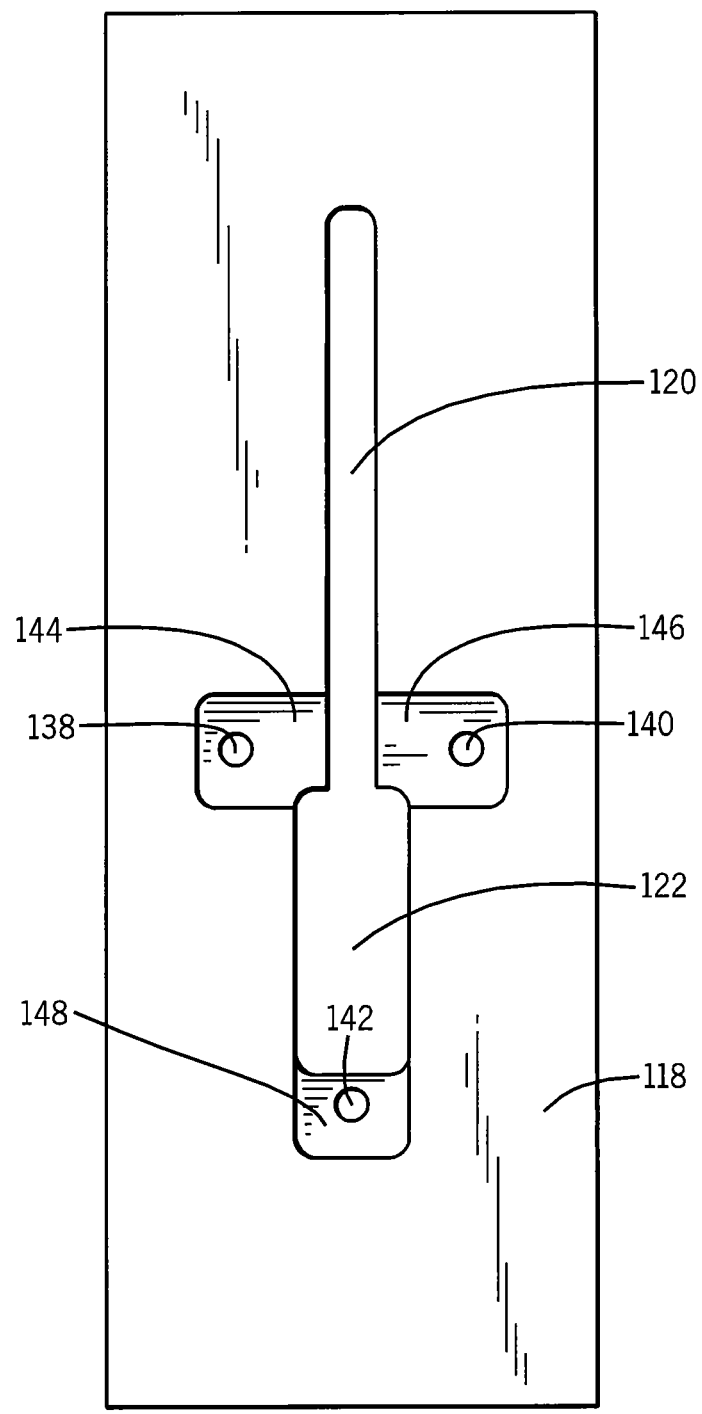
FIG. 10 is a bottom plan view of the presser board shown in FIG. 9.
Figure 11:
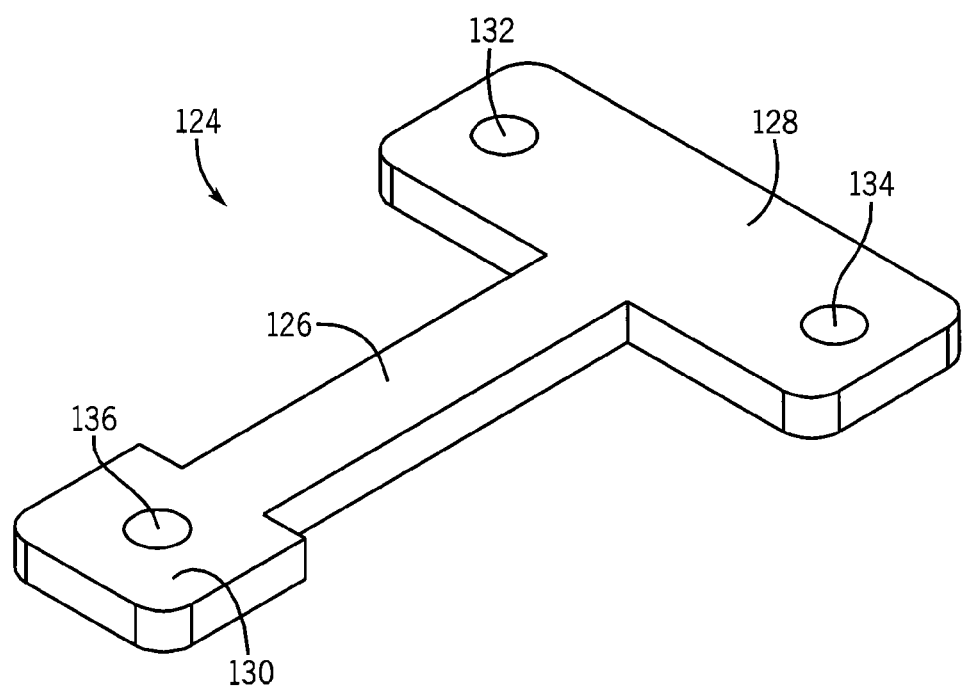
FIG. 11 is an isometric view of a mounting adapter used to mount the presser board of FIG. 10 to the presser assembly of FIG. 9.

With additional reference to FIG. 10, the presser board 118 has an elongated opening 120 and a rectangular shaped opening 122. The elongated opening 120 is sized to receive the arm 112 when the presser 104 is lowered. The rectangular opening 122 is sized to receive the foot 108 and rail 42. In this embodiment, a T-shaped adapter 124, shown in FIG. 11, is used to mount the presser board 118 to the presser 104.

The T-shaped adapter 124 has a thin profile body with a central post 126 and first and second mounting flanges 128, 130 extending from opposite ends of the central post. The central post 126 is sized to be received in the lower channel 52 of the rail. The first mounting flange 128 has a pair of mounting holes 132, 134 and the second mounting flange 130 has a single mounting hole 136. These holes align with mounting holes 138, 140, and 142, respectively, formed in the bottom surface of presser board 118.

The bottom surface of the presser board 118 has three slightly recessed portions 144, 146, and 148 that receive the mounting flanges 128 and 130. The recessed portions 144, 146, 148 allow the adapter 124 to be flush mounted to the presser board 118. The recessed portions 144, 146, 148, also assist in aligning the holes 132, 134, and 136 of the adapter 124 with holes 138, 140, and 142 of the presser board 118. Screws (not shown) may then be used to couple the presser board 118 to the adapter 124.

The presser plate and the presser boards described herein may be formed of wood, wood composite, metal, metal composite, alloy, plastic or other material.

From the foregoing description, drawings, and claims that follow, it will be appreciated that the present invention provides a mounting arrangement for coupling various types of presser members to a presser. The mounting arrangement includes a rail adapted to be drop loaded with a presser plate or an adapter that can be fastened to a presser board. The rail may also slidably receive a foot pivotably coupled to the stem of the presser. In this regard, the rail clamps the presser plate or the mounting adapters to the foot without requiring the use of screws or other fasteners. The invention may be used with presser plates as well as presser boards. It will also be appreciated that the present invention provides a method for attaching a presser plate or presser board to a presser.

Many changes and modifications could be made to the invention without departing from the spirit thereof. The scope of these changes will become apparent from the appended claims.

I claim:

1. A presser assembly for a blank making machine, comprising:
    a shaft having a terminal end;
    a foot pivotably coupled to the terminal end of the shaft;
    a rail having first and second ends and defining an upper channel and a lower channel, the foot being receivable in the upper channel; and
    a planar member retained in the lower channel of the rail, the planar member having at least one end extending beyond the first end of the rail.

2. The presser assembly of claim 1 wherein the planar member is a metallic presser plate.

3. The presser assembly of claim 1 wherein the rail is configured such that the foot is slidably received by the upper channel.

4. The presser assembly of claim 1 further comprising a presser board coupled to the planar member.

5. The presser assembly of claim 4 wherein the planar member is a mounting plate having at least one opening and wherein the presser board has at least one hole aligned with the at least one opening, and further comprising at least one fastener extending through the least one opening and the least one hole to couple the presser board to the mounting plate.

6. The presser assembly of claim 4 wherein the presser board is made of wood.

7. The presser assembly of claim 1 wherein the planar member is made of one of metal and a metal composite.

8. A presser assembly for a blank making machine, comprising:
    a shaft having a terminal end;
    a foot operatively coupled to the terminal end of the shaft;
    a rail defining an upper channel and a lower channel, the foot being receivable in the upper channel;
    a planar member retained in the lower channel of the rail, the planar member including a mounting plate having at least one opening;
    a presser board coupled to the planar member, the presser board having at least one hole aligned with the at least one opening, and at least one fastener extending through the least one opening and the least one hole to couple the presser board to the mounting plate.

9. A presser assembly for a blank making machine, comprising:
   a shaft having a terminal end;
   a foot operatively coupled to the terminal end of the shaft;
   a rail defining an upper channel and a lower channel, the foot being receivable in the upper channel; and
   a planar member retained in the lower channel of the rail;
   wherein the upper channel is wider than the lower channel.

10. The presser assembly of claim 9 wherein the rail has a lower portion defined by a base and first and second upturned members extending from the base, and an upper portion defined by a first wall extending from an exterior surface of the first upturned member and a second wall extending from an exterior surface of the second upturned member, and wherein top surfaces of the upturned walls define a lower bound of the upper channel and provide a seat for the foot.

11. The presser assembly of claim 10 further comprising first and second inturned members extending inwardly from the first and second upturned members, respectively, and wherein bottom surfaces of the first and second inturned members define an upper bound of the upper channel.

12. A presser assembly for a blank making machine, comprising:
   a shaft having a terminal end;
   a foot pivotably coupled to the terminal end of the shaft;
   a rail defining an upper channel and a lower channel, the foot being receivable in the upper channel;
   a planar member retained in the lower channel of the rail; and
   a presser board coupled to the planar member, the presser board being made of wood.

* * * * *